May 26, 1931.                G. L. WILLITS                1,806,728
                            DRAWBAR ATTACHMENT
                     Filed Nov. 9, 1927    2 Sheets-Sheet 1

Inventor
Guy L. Willits
By Alex. Lagaard
   Attorney

May 26, 1931.  G. L. WILLITS  1,806,728
DRAWBAR ATTACHMENT
Filed Nov. 9, 1927   2 Sheets-Sheet 2
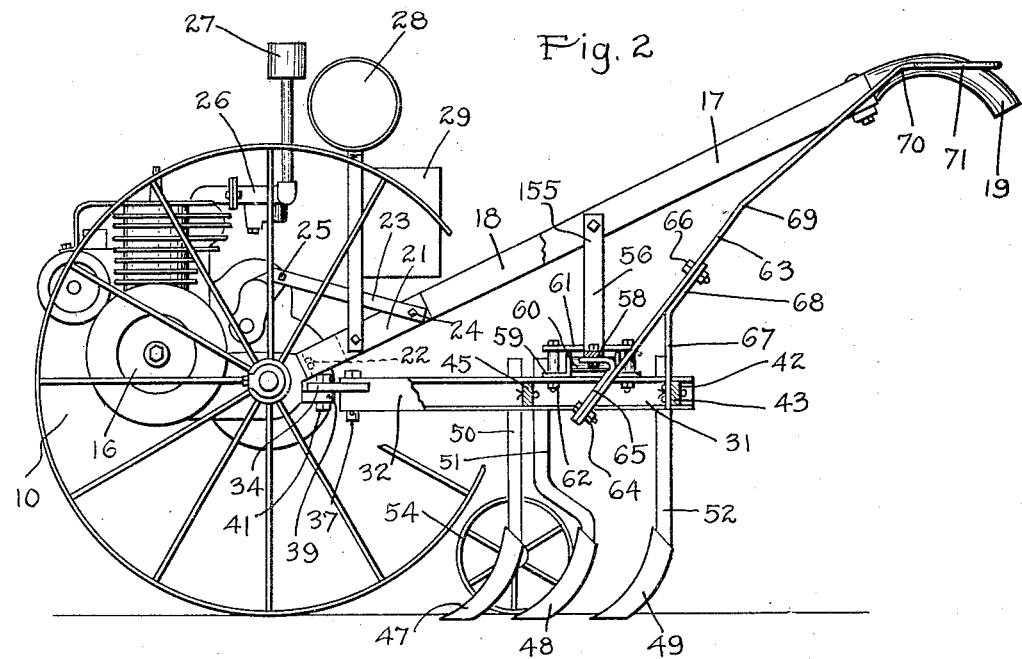
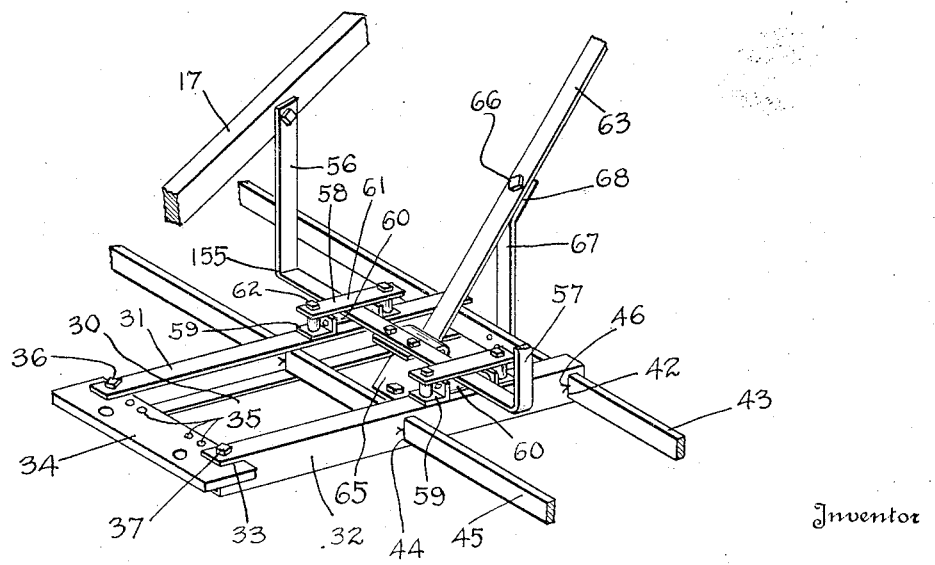
Inventor
Guy L. Willits
By Alex. Lagaard
Attorney Patented May 26, 1931

1,806,728

UNITED STATES PATENT OFFICE

GUY L. WILLITS, OF MINNEAPOLIS, MINNESOTA

DRAWBAR ATTACHMENT

Application filed November 9, 1927. Serial No. 232,045.

My invention relates to drawbar attachments for tractors and particularly such types of tractors commonly known as garden tractors.

An object of the invention resides in providing a structure by means of which numerous tools drawn by the tractor may be supported in staggered relation and by means of which the tools may be laterally shifted from side to side without altering the angular disposition of the same relative to the tractor proper.

An object of the invention resides in providing a pair of rearwardly extending spaced parallel drawbars swingably connected to the tractor frame and to provide a pair of transverse spaced parallel drawbar beams swingably connected to said drawbars and adapted to shift from side to side in parallel relation upon the swinging of said drawbars.

Another object of the invention resides in providing a support attached to the steering handles of the tractor, which support is arranged with a transverse rail overlying the drawbars at their rearward ends and to further provide said drawbars with rollers adapted to ride along said rail on the underside thereof, and to provide keepers superimposing said rollers and adapted to ride upon the said rail along the upper surface thereof.

A still further object of the invention resides in attaching to said rail a forwardly extending inclined arm and to attach to one of said drawbar beams an upwardly extending upright formed with a portion inclining in the same direction as said arm and to pivotally connect to said arm and beam a lever extending obliquely upwardly toward the hand grips of the steering handles for shifting said drawbar beam from side to side.

With the foregoing and other objects in view, which will appear in the following description, the invention resides in the novel combination and arrangement of parts and in the details of construction hereinafter described and claimed.

In the drawings, Fig. 1 is a plan view of a tractor illustrating my improved drawbar attachment mounted thereon.

Fig. 2 is a side elevational view of the structure shown in Fig. 1 with portions thereof removed to illustrate the method of connecting my drawbar attachment to the tractor.

Fig. 3 is a fragmentary perspective view of the drawbar attachment proper.

Figure 1:
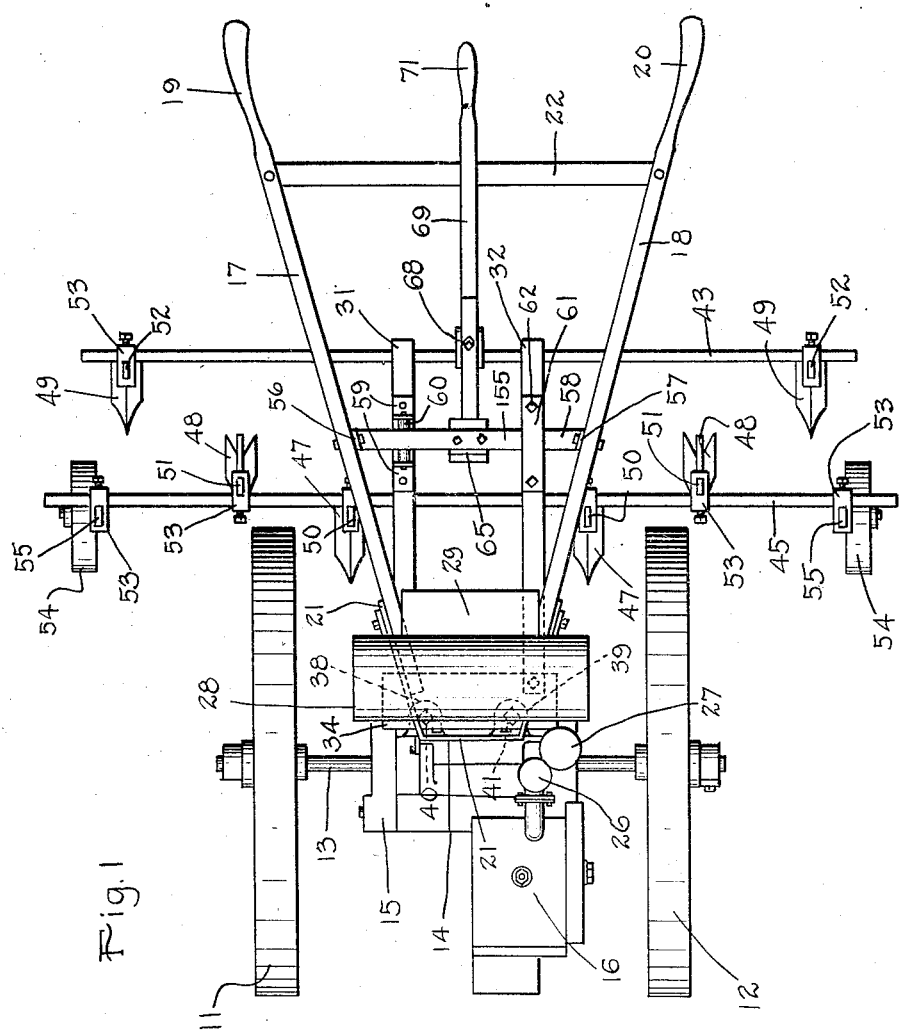

In the use of garden tractors it is highly desirable to shift the tools in use from side to side so as to cause the same to follow the desired paths and avoid injuring the plants during the operation of the tractor. While so shifting the tools it is highly desirable to have the same retain a fixed angular relation with respect to the direction of travel of the tractor so as to cause the tools to function at all times in the proper and most efficient manner. My invention permits of so manipulating and adjusting the tools, as will presently become apparent.

For the purpose of illustrating the application of my invention, I have shown in the drawings a tractor 10 which may be of any desired type. In the instant case the tractor 10 comprises two supporting wheels 11 and 12 carried upon an axle 13. A framework 14 including a transmission case 15 is mounted upon the said axle and carries an engine 16 disposed forwardly of said axle. In conjunction with the frame 14 two steering handles 17 and 18 are illustrated which are attached to said framework near the axle 13 thereof and which extend rearwardly of and upwardly from the said axle in flaring relation to one another terminating in the usual hand grips 19 and 20. Handles 17 and 18 may be constructed of wood or metal as desired, and are preferably attached to a yoke 21 secured to the framework 14 by bolts 24. The upper ends of these handles are held in proper relation by means of a bar 22, which extends transversely across the same and is rigidly bolted thereto. These handles are further braced relative to the framework 14 by means of two braces 23 which are bolted to said handles by means of one of the bolts 24 connecting the said handles and the yoke 21 and are further connected to portions of the transmission housing by means of additional bolts 25. The particular tractor shown is further provided with a carbureter 26, an air cleaner 27, a gasoline tank 28 and a battery box 29 together with such other equipment as is customary and essential with tractors of the type shown.

The invention proper which is indicated in its entirety in Fig. 1 at 30 comprises two spaced parallel drawbars 31 and 32 which are preferably constructed of channel iron and are slotted at one end as indicated at 33 to receive a plate 34. This plate is arranged with a number of holes 35 along one edge thereof by means of which the drawbars 31 and 32 may be adjustably attached to said plate at varying positions thereon by means of two bolts 36 and 37. The plate 34 is adapted to be bolted to the tractor through two lugs 38 and 39 formed on the framework 15, as best shown in Fig. 1, by means of two bolts 40 and 41. At the rearward end of the two drawbars 31 and 32 are formed two slots 42 which extend completely through the webs thereof so as to receive a drawbar beam 43 in transverse relation relative to said drawbars. Intermediate the two ends of the said drawbar beams are similarly arranged slots 44 to receive a second drawbar beam 45 parallel to and spaced from the drawbar 43. These slots 42 and 44 are constructed sufficiently large to permit the drawbar beams 43 and 45 to swing relative to said drawbars when the same are swung upon the bolts 36 and mounted on the plate 34. For holding the drawbar beams 43 and 45 in proper position relative to the drawbars 31 and 32, and for holding the said drawbars in proper parallel position I employ a number of cotter pins 46 which pass through said drawbar beams adjacent the web of the drawbars 31 and 32 and hold the said drawbars from longitudinal movement relative to the drawbars proper. These cotter pins are sufficiently spaced from the web to allow the swinging movement of the drawbar beams relative to the drawbars so that the said drawbars may be shifted from side to side upon the swinging of the drawbars upon their pivots and may be attached at varying position to correspond to the positions of the drawbars. It will be noted with this construction that upon the shifting of the drawbar beams 43 and 45 from side to side that the same occupy parallel positions with respect to the plate 34 and the axle 13 of the tractor proper. This is for the purpose of maintaining the same angularly of the tools operating in conjunction with the drawbar structure relative to the direction of travel of the tractor.

For the purpose of further illustrating the application of my invention I have shown mounted upon the two drawbars 45 and 43 a number of cultivator tools 47, 48 and 49. These tools are carried on posts 50, 51 and 52 which are attached to the drawbar by means of suitable clamps 53. Although I have shown cultivator tools it can readily be comprehended that any desired type of tool may be employed and equally as well mounted upon the drawbar beams as the particular tools illustrated. In conjunction with this construction trailer wheels 54 may be employed which can be journaled on posts 55 and clamped to the ends of the drawbar 45 by means of clamps 53, the same as the various tools. With this construction the depth at which tools operate may be regulated at will so as to cause the device to function in the desired manner.

For supporting the rearward end of the drawbar attachment 30 I provide a depending support 155 which consists of two legs 56 and 57 attached to the handles 17 and 18 of the tractor proper. These legs have connected to them a transverse rail 58 which overlies the two drawbars 31 and 32. Upon the upper surface of these drawbars are mounted bearings 59 in which are journaled rollers 60, which engage the undersides of the rail 58 and transmit the thrust from the tools mounted upon the drawbar beams directly to the frame of the tractor. Superimposing these rollers are arranged keepers 61 which are bolted across the bearings 59 and held in fixed position thereon through bolts 62. These keepers ride along the upper surface of the rail 58 and serve to hold the drawbar structure attached to the tractor when the direction of the thrust is reversed. It will be readily comprehended with this construction that the drawbar structure may be readily swung upon the bolts 36 and 37, the rollers 60 riding along the underside of the rail 58 and thereby reducing the friction in the shifting of the device.

For shifting the drawbar beams 43 and 45 from side to side I employ an upwardly extending oblique lever 63 which is pivoted at one end through a bolt 64 to a downwardly extending arm 65 bolted to the rail 58 near the center thereof. Intermediate the ends of said lever the same is pivoted through a bolt 66 to an upright 67 secured to the drawbar beam 43 at its center. Both the arm 65 and the upper portion 68 of the upright 67 are inclined so as to cause the lever 63 to extend obliquely upwardly toward the two hand grips 19 and 20 of the handles 17 and 18. Lever 63 is bent at 69 and 70 so as to cause the same to ride upon the bar 22 connecting handles 17 and 18 so as to present the extreme end thereof in a convenient position to be manipulated by the operator and which is constructed as shown at 71 in Fig. 1 to form a hand grip for readily operating the device.

In the use of my invention the tools are attached to the drawbar beams 43 and 45 in the usual manner, the wheels 11 and 12 of the tractor and the drawbars 31 and 32 being adjusted to accommodate the width of the row upon which the tractor is to operate. When the tractor is propelled through its engine 16 the tools mounted on the drawbar beams 43 and 45 follow naturally behind the tractor. When it is desired, the handle 71 may be readily grasped by the operator and shifted from side to side along the bar 22 causing the two drawbars 43 and 45 to be moved laterally so as to cause the tools to follow along the desired paths. Due to the leverage available in the lever 63 and due to the rollers 60 coacting with the rail 58, the drawbar structure may be easily and effectively shifted.

The invention is highly advantageous in that it provides a simple and effective device for controlling the position of the tools used in conjunction with the drawbar beams, which control is effected through the operation of a simple lever having a handle positioned within ready reach of the operator. The device operates with a minimum amount of effort and functions so as to maintain the tools at all times at the proper angle relative to the direction of travel of the tractor. All the parts are readily accessible for oiling or cleaning and the entire structure may be quickly removed from the tractor for the purpose of repair or interchange.

Changes in the specific form of my invention, as herein disclosed, may be made within the scope of what is claimed without departing from the spirit of my invention.

Having described my invention, what I claim as new and desire to protect by Letters Patent is:

1. In combination with the frame and steering handles of a tractor, a pair of spaced parallel drawbars pivoted to said frame and extending rearwardly thereof, a support secured to said handles and extending downwardly toward said drawbars, a rail formed on said support for co-operation with said drawbars for holding the same in proper elevation relative to said handles, said drawbars being shiftable transversely relative to said rail, a drawbar beam swingably mounted in said drawbars and adapted to be shifted in parallel relation from one side to the other upon the swinging of said drawbars, and means supported from said handles for shifting said drawbar beam from one side to the other.

2. In combination with the frame and upwardly extending steering handles of a tractor, a pair of drawbars swingably connected to said frame and extending rearwardly thereof, a support secured to said handles above the same and toward the rearmost portions thereof, a rail formed on said support traversing said drawbars, said drawbars being shiftable transversely along said rail, a drawbar beam swingably mounted in both of said drawbars and adapted to be shifted laterally and to move in parallel positions upon the swinging of said drawbars, and a lever pivoted to said support and to said drawbar beam for shifting said drawbar beam from one side to the other.

3. In combination with the frame and upwardly extending steering handles of a tractor, a pair of drawbars swingably connected to said frame and extending rearwardly thereof, a support secured to said handles above the same and toward the rearmost portions thereof, a rail formed on said support traversing said drawbars, said drawbars being shiftable transversely along said rail, rollers journaled to said drawbars adapted to ride along the undersides of said rail, keepers attached to said drawbars and superimposing said rollers, said keepers riding upon the upper surface of said rail, a drawbar beam swingably connected to said drawbars, and means for transversely shifting said drawbar beam relative to said tractor.

4. In combination with the frame and upwardly extending steering handles of a tractor, a pair of drawbars swingably connected to said frame and extending rearwardly thereof, a support secured to said handles above the same and toward the rearmost portions thereof, a rail formed on said support traversing said drawbars, said drawbars being shiftable transversely along said rail, a drawbar beam swingably mounted in both of said drawbars and adapted to be shifted laterally and to move in parallel positions upon the swinging of said drawbars, an arm extending downwardly from said rail, an upright secured to said drawbar beam and a lever pivoted to said arm and upright for swinging said beam from side to side.

5. In combination with the frame and upwardly extending steering handles of a tractor, a pair of drawbars swingably connected to said frame and extending rearwardly thereof, a support secured to said handles above the same and toward the rearmost portions thereof, a rail formed on said support traversing said drawbars, said drawbars being shiftable transversely along said rail, a drawbar beam swingably mounted in both of said drawbars and adapted to be shifted laterally and to move in parallel positions upon the swinging of said drawbars, an arm extending downwardly from said rail, an upright secured to said drawbar beam and a lever pivoted to said arm and upright for swinging said beam from side to side, said arm and upright being arranged to cause said lever to extend obliquely upwardly toward said steering handles.

6. In combination with the frame and upwardly extending steering handles of a tractor, a pair of drawbars swingably connected to said frame and extending rearwardly thereof, a support secured to said handles above the same and toward the rearmost portions thereof, a rail formed on said support traversing said drawbars, a depending arm formed on said rail extending forwardly thereof, an upright secured to said drawbar beam having a portion inclined in the same direction as said arm, an obliquely positioned lever pivoted to said arm and to said upright for shifting said drawbar beam from side to side, said lever extending upwardly in proximity to said steering handles, and a bar extending across said steering handles underlying the upper portion of said lever.

7. In combination with the frame and upwardly extending steering handles of a tractor, a drawbar structure swingably connected to said frame and extending rearwardly thereof, a support secured to said handle, an upright secured to said drawbar structure and a lever pivoted to said support and to said upright for shifting the drawbar structure from side to side, said upright pivot being disposed above said support pivot.

8. In combination with the frame and steering handles of a tractor, a pair of spaced parallel drawbars pivoted to said frame and extending rearwardly thereof, a support secured to said handles and extending downwardly toward said drawbars, a rail formed on said support for cooperating with said drawbars for holding the same at a given elevation relative to said handles, said drawbars being shiftable transversely relative to said rail, a drawbar beam swingably mounted on said drawbars and adapted to be shifted in parallel relation from one side to the other upon the swinging of said drawbars, and means for holding said drawbar beam in shifted position relative to said support.

9. In combination with the frame and upwardly extending steering handles of a tractor, a drawbar swingably connected to said frame and extending rearwardly thereof, a depending support secured to said handles and extending in proximity to the end of said drawbar, guiding means on said support transversing said drawbar for guiding the same, said drawbar being shiftable transversely along said guiding means, and implement supporting means attached to said drawbar.

10. In combination with the frame and steering handles of a tractor, a drawbar swingingly connected to said frame and extending rearwardly thereof, means for guiding said drawbar for lateral movement relative to said frame, an upright extending upwardly from said drawbar, an arm extending downwardly from said guiding means, and a lever pivoted to said arm and upright for swinging said drawbar from side to side, said arm and upright being arranged to cause said lever to extend obliquely upwardly toward said steering handles.

11. In combination with the frame and steering handles of a tractor, a drawbar swingingly connected to said frame and extending rearwardly thereof, means for guiding said drawbar for lateral movement relative to said frame, an upright extending upwardly from said drawbar, an arm extending downwardly from said guiding means, a lever pivoted to said arm and upright for swinging said drawbar from side to side, said arm and upright being arranged to cause said lever to extend obliquely upwardly toward said steering handles, and a bar extending across said steering handles and underlying the upper portion of said lever.

12. In combination with the frame, supporting wheels and steering handle of a tractor, a tool supporting structure pivoted to said frame and adapted to swing laterally, a support atached to said handle, a lever pivoted to said support and to said tool supporting structure for movement laterally in a plane parallel with the axis of said wheels, the pivot for said tool supporting structure being behind the pivot for said support.

13. In combination with the frame of a tractor, a draw bar structure swingably connected to said frame and extending rearwardly thereof, a support for said draw bar structure immovable relative to said frame, an upright secured to said draw bar structure, and a lever pivoted to said support and to said upright for shifting the draw bar structure from side to side, said upright pivot being disposed above the pivot on said support.

14. In combination with the frame and steering handle of a tractor, a draw bar structure pivoted to said frame and extending rearwardly thereof, tool supporting means carried by said draw bar structure, a depending support rigidly secured to said handle and having a horizontal surface, said draw bar structure being adapted to engage said horizontal surface for resisting the overturning reaction of the tractor, and a keeper for limiting the movement of said draw bar structure away from said horizontal surface.

15. In combination with a tractor having a frame and a pair of steering handles rigidly connected thereto and extending rearwardly thereof, a draw bar structure pivoted to said frame and extending rearwardly thereof, tool supporting means carried by said draw bar structure, a bracket secured to both of said handles for bracing the same and having a horizontal surface, said draw bar structure being adapted to engage said horizontal surface for resisting the overturning reaction of the tractor, and a keeper for limiting the movement of said draw bar structure away from said horizontal surface.

16. In combination with a tractor having a frame and a pair of steering handles rigidly connected thereto and extending rearwardly thereof, a draw bar structure pivoted to said frame and extending rearwardly thereof, tool supporting means carried by said draw bar structure, a U-shaped bracket secured to both of said handles for bracing the same and formed with legs depending therefrom and connected through a horizontal portion, said draw bar structure being adapted to engage said horizontal portion for resisting the overturning reaction of the tractor, and a keeper for limiting the movement of said draw bar structure away from said horizontal surface.

17. In combination with a frame and handle of a tractor, a draw bar structure swingably connected to said frame and extending rearwardly thereof, a support immovable relative to said frame, a lever pivotally connected to said support and to said draw bar structure for swinging the same from side to side, said lever having an upwardly extending handle, the distance between said handle and either of the pivotal connections of said lever being greater than the distance between said pivotal connections.

18. In combination with the frame and steering handles of a tractor, a draw bar structure swingably connected to said frame and extending rearwardly thereof, means for guiding said draw bar structure for lateral movement relative to said frame, a lever pivotally connected to said guiding means and to said draw bar structure, said lever having a handle situated above its pivotal connections for swinging said draw bar structure from side to side.

In testimony whereof I have affixed my signature to this specification.

GUY L. WILLITS.